United States Patent
Lindgren et al.

(10) Patent No.: US 10,051,063 B2
(45) Date of Patent: Aug. 14, 2018

(54) MITIGATING BACKEND SIGNALING OVERLOAD

(71) Applicant: NOKIA SOLUTIONS AND NETWORKS OY, Espoo (FI)

(72) Inventors: Tommy Johannes Lindgren, Espoo (FI); Jarkko Henrikki Ansamaa, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 190 days.

(21) Appl. No.: 14/892,408

(22) PCT Filed: May 22, 2013

(86) PCT No.: PCT/EP2013/060469
§ 371 (c)(1),
(2) Date: Nov. 19, 2015

(87) PCT Pub. No.: WO2014/187479
PCT Pub. Date: Nov. 27, 2014

(65) Prior Publication Data
US 2016/0094666 A1    Mar. 31, 2016

(51) Int. Cl.
| | |
|---|---|
| *H04W 76/10* | (2018.01) |
| *H04L 29/08* | (2006.01) |
| *H04W 28/02* | (2009.01) |
| *H04W 36/12* | (2009.01) |
| *H04W 76/14* | (2018.01) |
| *H04W 88/16* | (2009.01) |

(52) U.S. Cl.
CPC ............ *H04L 67/148* (2013.01); *H04L 67/14* (2013.01); *H04W 28/0284* (2013.01); *H04W 36/12* (2013.01); *H04W 76/14* (2018.02); *H04W 88/16* (2013.01)

(58) Field of Classification Search
None
See application file for complete search history.

(56) References Cited

U.S. PATENT DOCUMENTS 7,206,826 B1 *  4/2007  Parker .................. H04L 63/083
                                                     709/206
8,073,472 B1 * 12/2011  Thakur ................. G06Q 20/10
                                                     455/466

(Continued)

OTHER PUBLICATIONS

International Search Report and Written Opinion dated Jul. 4, 2013 corresponding to International Patent Application No. PCT/EP2013/060469.

*Primary Examiner* — Kashif Siddiqui
(74) *Attorney, Agent, or Firm* — Squire Patton Boggs (US) LLP

(57) ABSTRACT

A method and apparatus can be configured to determine whether a backend system is unreachable by a gateway. The method also includes establishing a temporary session between the gateway and a user equipment. The user equipment does not attempt to further re-establish another session with the gateway after the temporary session is established. The temporary session is configurable by an operator. The method also includes ending the temporary session between the gateway and the user equipment. Ending the temporary session allows the user equipment to attempt to re-establish another session with the gateway.

12 Claims, 5 Drawing Sheets

(56) References Cited

U.S. PATENT DOCUMENTS

| | | | | |
|---|---|---|---|---|
| 8,423,821 | B1* | 4/2013 | Keith, Jr. | G06F 11/201 |
| | | | | 714/13 |
| 9,648,515 | B2* | 5/2017 | Velev | H04W 28/12 |
| 2006/0173866 | A1 | 8/2006 | Newport | |
| 2010/0220656 | A1* | 9/2010 | Ramankutty | H04L 45/025 |
| | | | | 370/328 |
| 2012/0069737 | A1* | 3/2012 | Vikberg | H04W 28/12 |
| | | | | 370/232 |
| 2012/0236708 | A1* | 9/2012 | Kompella | H04W 24/04 |
| | | | | 370/220 |
| 2012/0239966 | A1* | 9/2012 | Kompella | H04W 24/04 |
| | | | | 714/4.11 |
| 2013/0250750 | A1* | 9/2013 | Nishida | H04W 76/00 |
| | | | | 370/216 |
| 2014/0007200 | A1* | 1/2014 | Zisimopoulos | H04L 63/102 |
| | | | | 726/4 |
| 2014/0032491 | A1* | 1/2014 | Neerincx | G06F 17/30345 |
| | | | | 707/610 |
| 2015/0236863 | A1* | 8/2015 | Castro Castro | H04L 12/1407 |
| | | | | 370/259 |
| 2015/0271275 | A1* | 9/2015 | He | H04L 12/1407 |
| | | | | 709/228 |
| 2017/0142773 | A1* | 5/2017 | Nair | H04W 76/027 |

* cited by examiner

MITIGATING BACKEND SIGNALING OVERLOAD

BACKGROUND

Field

Embodiments of the invention relate to configuring how an incoming session request is served, based on a responsiveness of a backend system.

Description of the Related Art

Gateway elements in a 3rd Generation Partnership Project (3GPP) architecture (such as Gateway GPRS Support Nodes (GGSN) and/or System Architecture Evolution Gateways (SAE-GW)) can support different kinds of networks, such as general packet radio service networks, high speed packet access networks, and/or Long-term Evolution (LTE) networks, for example. LTE is a standard for wireless communication that seeks to provide improved speed and capacity for wireless communications by using new modulation/signal processing techniques. The standard was proposed by 3GPP, and is based upon previous network technologies. Since its inception, LTE has seen extensive deployment in a wide variety of contexts involving the communication of data.

SUMMARY

According to a first embodiment, a method may comprise determining whether a backend system is unreachable by a gateway. The method may also comprise establishing a temporary session between the gateway and a user equipment. The user equipment does not attempt to further re-establish another session with the gateway after the temporary session is established. The temporary session is configurable by an operator. The method may also comprise ending the temporary session between the gateway and the user equipment, wherein ending the temporary session allows the user equipment to attempt to re-establish another session with the gateway.

In the method of the first embodiment, the backend system is unreachable at least because a part of a network has become overloaded or a system fault has occurred within the network.

In the method of the first embodiment, the backend system is one of an online charging server, an authentication/authorization/accounting server, a radius authentication server, or a policy charging and rules function server.

In the method of the first embodiment, the established temporary session is a virtual session, and the virtual session allows for limited or no access to services by the user equipment.

In the method of the first embodiment, the length of the established temporary session is controlled using a temporary session timer.

According to a second embodiment, an apparatus may comprise at least one processor. The apparatus may also comprise at least one memory including computer program code. The at least one memory and the computer program code can be configured, with the at least one processor, to cause the apparatus at least to determine whether a backend system is unreachable by a gateway. The apparatus can also establish a temporary session between the gateway and a user equipment. The user equipment does not attempt to further re-establish another session with the gateway after the temporary session is established. The temporary session is configurable by an operator. The apparatus can also end the temporary session between the gateway and the user equipment. Ending the temporary session allows the user equipment to attempt to re-establish another session with the gateway.

In the apparatus of the second embodiment, the backend system is unreachable at least because a part of a network has become overloaded or a system fault has occurred within the network.

In the apparatus of the second embodiment, the backend system is one of an online charging server, an authentication/authorization/accounting server, a radius authentication server, or a policy charging and rules function server.

In the apparatus of the second embodiment, the established temporary session is a virtual session, and the virtual session allows for limited or no access to services by the user equipment.

In the apparatus of the second embodiment, the length of the established temporary session is controlled using a temporary session timer.

According to a third embodiment, a computer program product can be embodied on a computer readable medium. The computer program product can be configured to control a processor to perform a process comprising determining whether a backend system is unreachable by a gateway. The process can also comprise establishing a temporary session between the gateway and a user equipment. The user equipment does not attempt to further re-establish another session with the gateway after the temporary session is established. The temporary session is configurable by an operator. The process can also comprise ending the temporary session between the gateway and the user equipment. Ending the temporary session allows the user equipment to attempt to re-establish another session with the gateway.

In the computer program product of the third embodiment, the backend system is unreachable at least because a part of a network has become overloaded or a system fault has occurred within the network.

In the computer program product of the third embodiment, the backend system is one of an online charging server, an authentication/authorization/accounting server, a radius authentication server, or a policy charging and rules function server.

In the computer program product of the third embodiment, the established temporary session is a virtual session, and the virtual session allows for limited or no access to services by the user equipment.

In the computer program product of the third embodiment, the length of the established temporary session is controlled using a temporary session timer.

BRIEF DESCRIPTION OF THE DRAWINGS

For proper understanding of the invention, reference should be made to the accompanying drawings, wherein.

DETAILED DESCRIPTION

In mobile packet core networks, operator backend servers may become unreachable. The operator backend servers may become unreachable because a part of the network has become overloaded, or because a system fault has occurred within the network, for example.

Figure 1:
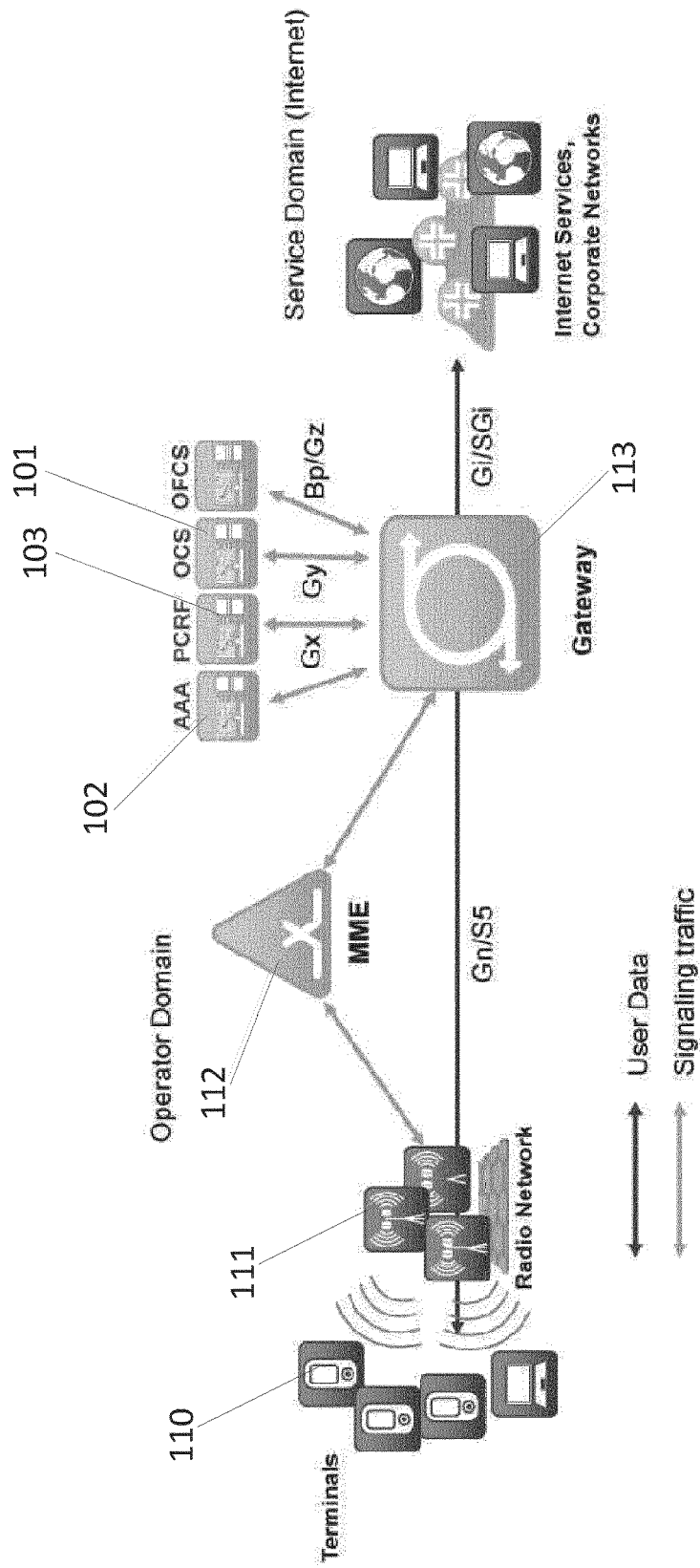
FIG. 1 illustrates a typical configuration between backend servers and a mobile gateway.

FIG. 1 illustrates a typical configuration between backend servers and a mobile gateway. Referring to FIG. 1, backend servers may generally include servers such as online charging servers (OCS) 101, authentication/authorization/accounting servers (AAA) 102, radius authentication servers, and policy charging and rules function servers (PCRF) 103.

In general, a user equipment (UE), such as a mobile terminal 110, can establish a session between mobile terminal 110 and a gateway 113. Mobile terminal 110 can attempt to establish a session to access internet services, for example. In one embodiment, mobile terminal 110 can establish the session by initiating a session setup procedure. This session setup procedure can include sending signalling messages, from mobile terminal 110, through radio network 111 towards mobility management entity (MME) 112, and then to gateway 113. Different elements in the communication chain between mobile terminal 110 and gateway 113 can perform various procedures to check whether a session has been established or not. For example, MME 112 can contact a home location register (HLR) to check whether a subscriber holding mobile terminal 110 is subscribed to the services related to the session request. For example, MME 112 can check to see whether the subscriber holding mobile terminal 110 has access to a data plan.

When the request to establish the session arrives at gateway 113, gateway 113 can perform its own checks. Gateway 113 can contact AAA server 102, OCS server 101, and PCRF server 103 to determine whether mobile terminal 110 can be assigned an internet protocol (IP) address, whether the subscriber of mobile terminal 110 has funds in its prepaid account, whether the subscriber is authorized to open a session, and what kinds of policies should be applied for the subscriber's session, for example. Gateway 113 can then establish the session with mobile terminal 110.

When a part of a network has become overloaded, the backend servers may become unreachable. When the backend servers cannot be reached and/or when no response is received from the backend servers, the mobile terminals' established sessions (between the mobile terminals and the corresponding gateways) are generally ended/rejected. Once established sessions are ended for mobile terminals, the mobile terminals generally attempt to immediately re-establish the sessions. These reconnection attempts can lead to further overload of the network.

Mobile terminals that are categorized as "always-on" terminals are especially prone to attempting to immediately re-connect if an established session fails. Because of this type of behaviour, a backend overload may be prolonged and long-lasting instability within the network may occur. The users of the terminals will then experience longer waiting times for new sessions to be established (or not have any connections at all) due to the prolonged backend overload and instability.

Similar backend overloads can occur when sessions are established between terminals and serving GPRS support nodes (SGSN), mobility management entities (MME), gateway GPRS support nodes (GGSN), and/or signalling gateways (SGW). Overloads and failures can lead to massive signalling loads. Generally, signalling overloads worsen with LTE-deployed mobile terminals because such mobile terminals are generally "always-on."

With certain network gateways, it is possible to enable session creation in the event of a backend server outage. However, these sessions generally cannot be controlled by an operator. Specifically, an operator generally cannot impose subscriber-specific restrictions on the created sessions, nor be able to make credit checks relating to the created sessions.

The previous approaches may support performing rate control on backend server interfaces in order to limit an amount of messages sent by UEs (while the UEs attempt to re-establish their sessions) to reduce a messaging load. However, such rate control generally increases a signaling load. Such rate control will likely increase a signaling load on a mobile packet core as sessions are disconnected due to backend slow response rate, and such disconnections lead to the UEs immediately trying to re-establish their sessions.

In contrast with the previous approaches, one embodiment of the present invention allows an operator to configure, based on a responsiveness of backend servers, how incoming session requests are served. In one embodiment, the established sessions are configurable by an operator.

In one embodiment, each backend server can be categorized as a critical, a non-critical, and/or an optional system. These categories can be defined/configured by an operator. If a critical server is not responsive, a "virtual session" can be established between the gateway corresponding to the critical server and the UE. With such a virtual session, from the network point-of-view, the session is established between the user equipment and the gateway, but the user equipment can be restricted/limited from having access to any services. The purpose of establishing these virtual sessions can be to ease the effect of continuous attempts to re-establish sessions by the user equipment. In one embodiment, once these virtual sessions are established, the UEs do not attempt to re-establish sessions.

If a non-critical system is not responsive, a temporary session can be established in accordance with locally-defined policies. The locally-defined policies can define which services are allowed for the temporary sessions. When non-critical systems begin to be responsive, each temporary session can be disconnected in a planned manner (e.g., the temporary sessions can be disconnected via a slow-loop), and thus force the corresponding user equipment to attempt reconnection and perform normal session establishment. In one embodiment, the temporary sessions can be continued without forcing any disconnection.

In another embodiment, the length of temporary sessions can be controlled using temporary session timers. When a temporary session timer expires, one embodiment forces the relevant session to disconnect even if the backend server has not yet become responsive. These temporary session timers can prevent extensive usage of a backend server's resources. For example, when a prepaid server is not responding, an operator may prefer to limit the amount of service usage granted to the UEs.

If a packet data network gateway (PGW) or a Gateway GPRS Support Node (GGSN) does not receive a response from a backend server within required response times, PGW/GGSN can create the requested session as a temporary session and the length of the session can be determined in accordance with a temporary session timer. The temporary session timer can allot a time period of one hour for the temporary session, for example. The time periods designated by the temporary session timers are generally shorter than time periods designated by normal session timers, as discussed in more detail below. Further, other policies can govern the temporary sessions and allow only limited or no access to operator services. If an outage in a critical backend server occurs, then typically no access is granted for the UE.

On the other hand, if an outage in a non-critical server occurs, limited access can be granted.

Figure 2:
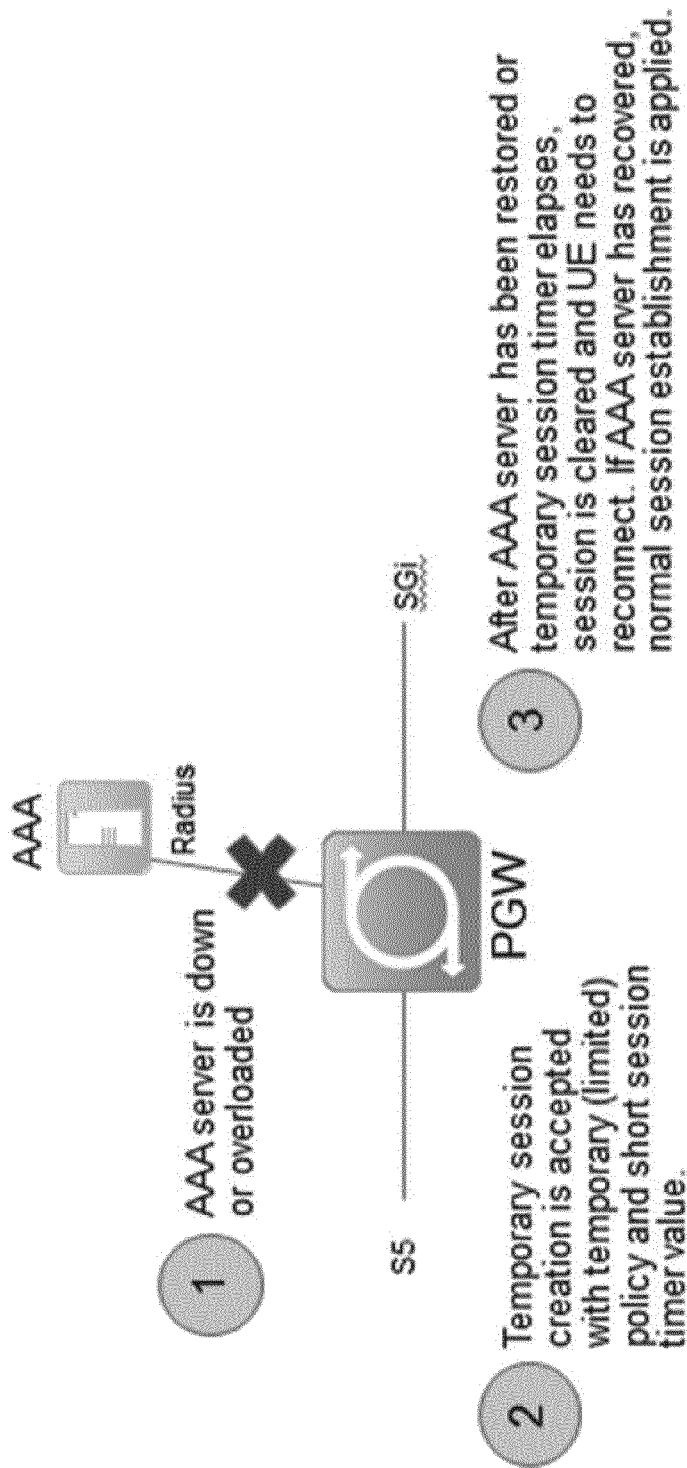
FIG. 2 illustrates a process of temporary session establishment in accordance with one embodiment.

FIG. 2 illustrates a process of temporary session establishment in accordance with one embodiment. In the example shown in FIG. 2, a backend server, such as an AAA server, can be overloaded. Therefore, sessions between the UEs and the corresponding gateway (the gateway corresponding to the AAA server) are ended. One embodiment can then establish temporary sessions that are controlled in accordance with temporary session timers. Then, once the AAA server is responsive again, the temporary session is ended, and the user equipment can then attempt to reconnect to the corresponding gateway to perform normal session establishment.

In one embodiment, as previously unavailable backend servers become available, or as the times kept by the temporary session timer elapse, the sessions can be forced to disconnect, which can lead to UEs attempting to re-establish the sessions. If backend functionality has been returned, the session can be established in accordance with the policies for "normal" session establishment, including the use of a normal session timer. The time allocated by a normal session timer can be long, such as lasting several days, for example. As described above, the normal session times are typically longer than temporary session times. The policies of normal session establishment can provide full access to subscribed services. On the other hand, if a backend server is still unreachable, the temporary session establishment procedures can be repeated.

In certain embodiments, the sessions can be terminated by GGSN or PGW in a controlled manner. By terminating sessions in a controlled manner, the signalling load on the backend servers can be mitigated. The signalling load on the backend servers can be mitigated because UEs will no longer constantly try to re-establish sessions. Such mitigation can considerably reduce the signalling load on an operator network. For example, given a subscriber base of 1 million UEs, one embodiment of the present invention can reduce signalling in overload/error conditions by over 99% (assuming each UE attempts to re-establish a session every 30 seconds after a failed session establishment). One embodiment can provide limited services to subscribers that normally would be prohibited from accessing the network for the services.

Figure 3:
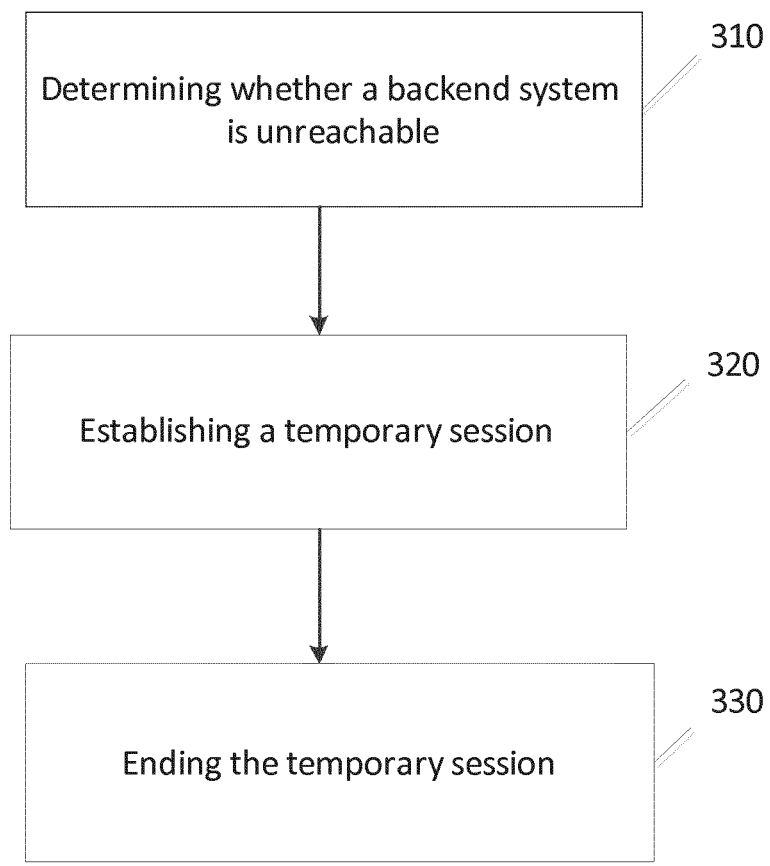
FIG. 3 illustrates a flowchart of a method in accordance with one embodiment.

FIG. 3 illustrates a logic flow diagram of a method according to an embodiment. The method illustrated in FIG. 3 includes, at 310, determining whether a backend system is unreachable by a gateway. At 320, the method includes establishing a temporary session between the gateway and a user equipment. The user equipment does not attempt to further re-establish another session with the gateway after the temporary session is established. The temporary session is configurable by an operator. At 330, the method also includes ending the temporary session between the gateway and the user equipment. Ending the temporary session allows the user equipment to attempt to re-establish another session with the gateway.

Figure 4:
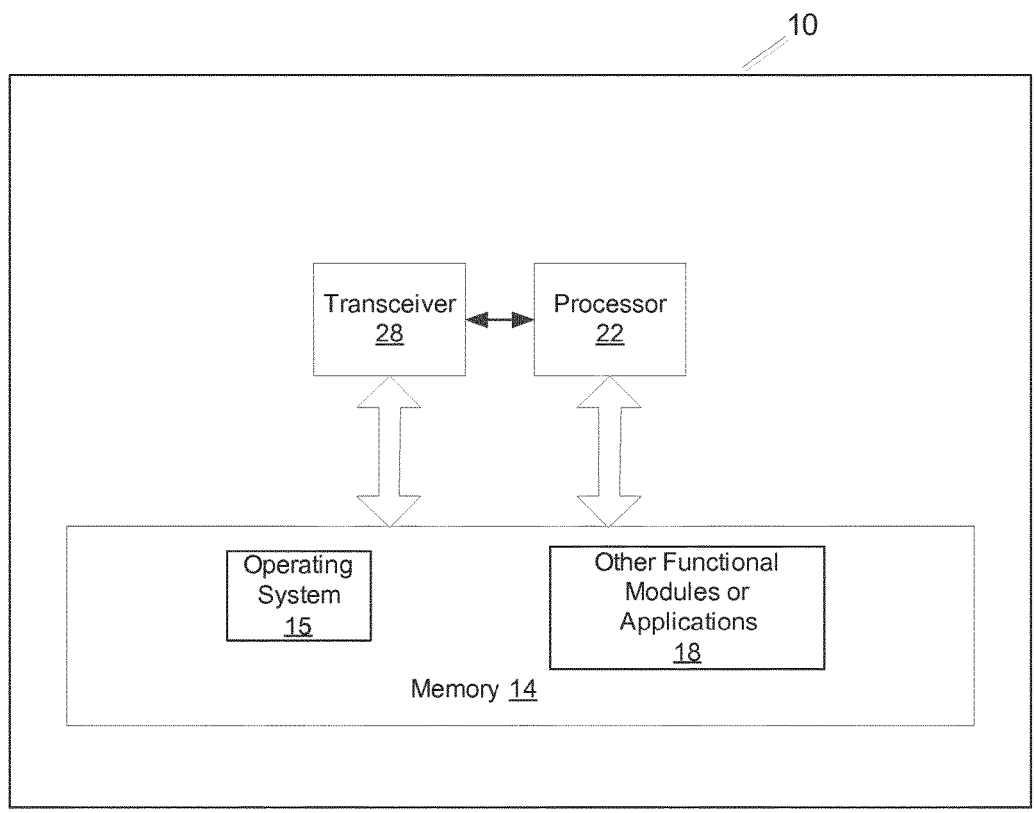
FIG. 4 illustrates an apparatus in accordance with one embodiment.

FIG. 4 illustrates an apparatus 10 according to another embodiment. In an embodiment, apparatus 10 can be a user equipment, for example. In another embodiment, apparatus 10 can be a node or a gateway.

Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
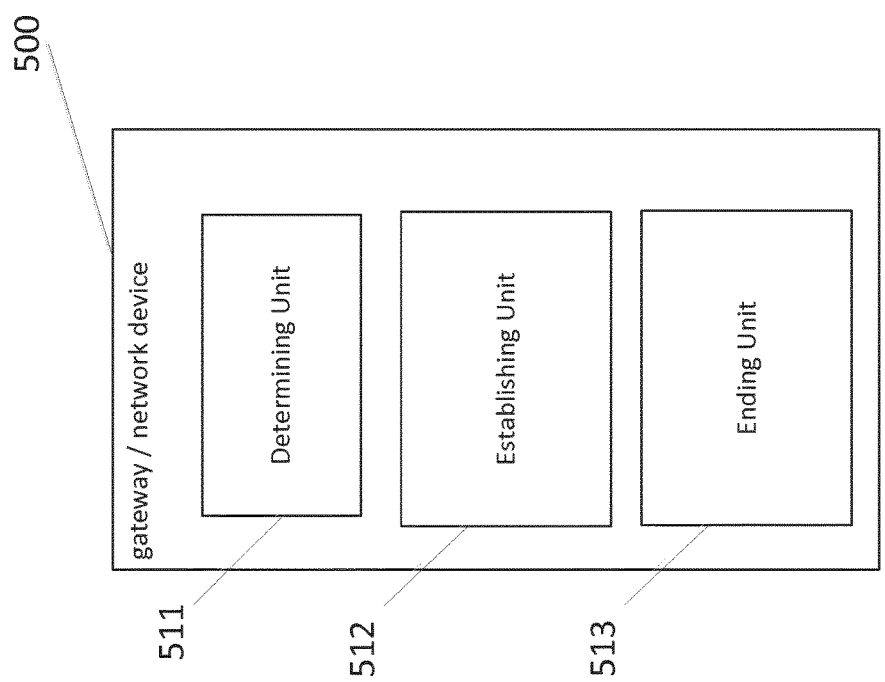
FIG. 5 illustrates an apparatus in accordance with one embodiment.

FIG. 5 illustrates an apparatus 500 according to another embodiment. Apparatus 500 can include a determining unit 511 that determines whether a backend system is unreachable by a gateway. The apparatus can also include an establishing unit 512 that establishes a temporary session between the gateway and a user equipment. The user equipment does not attempt to further re-establish another session with the gateway after the temporary session is established. The temporary session is configurable by an operator. The apparatus 500 also includes an ending unit 513 that ends the temporary session between the gateway and the user equipment. Ending the temporary session allows the user equipment to attempt to re-establish another session with the gateway.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining whether a backend system is unreachable by a gateway;
   establishing a temporary session between the gateway and a user equipment, wherein the user equipment does not attempt to further re-establish another session with the gateway while the temporary session is established, and the temporary session is configurable by an operator; and
   ending the temporary session between the gateway and the user equipment, wherein ending the temporary session allows the user equipment to attempt to re-establish another session with the gateway,
   wherein the established temporary session is a virtual session, and the virtual session allows for limited or no access to services by the user equipment.

2. The method according to claim 1, wherein the backend system is unreachable at least because a part of a network has become overloaded or a system fault has occurred within the network.

3. The method according to claim 1, wherein the backend system is one of an online charging server, an authentication/authorization/accounting server, a radius authentication server, or a policy charging and rules function server.

4. The method according to claim 1, wherein the length of the established temporary session is controlled using a temporary session timer.

5. An apparatus, comprising:
   at least one processor; and
   at least one memory including computer program code,
   the at least one memory and the computer program code configured, with the at least one processor, to cause the apparatus at least to:
   determine whether a backend system is unreachable by a gateway;
   establish a temporary session between the gateway and a user equipment, wherein the user equipment does not attempt to further re-establish another session with the gateway while the temporary session is established, and the temporary session is configurable by an operator; and
   end the temporary session between the gateway and the user equipment, wherein ending the temporary session allows the user equipment to attempt to re-establish another session with the gateway,
   wherein the established temporary session is a virtual session, and the virtual session allows for limited or no access to services by the user equipment.

6. The apparatus according to claim 5, wherein the backend system is unreachable at least because a part of a network has become overloaded or a system fault has occurred within the network.

7. The apparatus according to claim 5, wherein the backend system is one of an online charging server, an authentication/authorization/accounting server, a radius authentication server, or a policy charging and rules function server.

8. The apparatus according to claim 5, wherein the length of the established temporary session is controlled using a temporary session timer.

9. A computer program product, embodied on a non-transitory computer readable medium, the computer program product configured to control a processor to perform a process, comprising:
   determining whether a backend system is unreachable by a gateway;
   establishing a temporary session between the gateway and a user equipment, wherein the user equipment does not attempt to further re-establish another session with the gateway while the temporary session is established, and the temporary session is configurable by an operator; and
   ending the temporary session between the gateway and the user equipment, wherein ending the temporary session allows the user equipment to attempt to re-establish another session with the gateway,
   wherein the established temporary session is a virtual session, and the virtual session allows for limited or no access to services by the user equipment.

10. The computer program product according to claim 9, wherein the backend system is unreachable at least because a part of a network has become overloaded or a system fault has occurred within the network.

11. The computer program product according to claim 9, wherein the backend system is one of an online charging server, an authentication/authorization/accounting server, a radius authentication server, or a policy charging and rules function server.

12. The computer program product according to claim 9, wherein the length of the established temporary session is controlled using a temporary session timer.

* * * * *